June 13, 1967  E. E. MULCH  3,324,805

AUTOMOBILE PARKING APPARATUS

Filed May 6, 1965  3 Sheets-Sheet 1

INVENTOR.
ERNEST E. MULCH

WITNESS:

June 13, 1967   E. E. MULCH   3,324,805
AUTOMOBILE PARKING APPARATUS
Filed May 6, 1965   3 Sheets-Sheet 2

INVENTOR.
ERNEST E. MULCH

WITNESS:

June 13, 1967   E. E. MULCH   3,324,805
AUTOMOBILE PARKING APPARATUS
Filed May 6, 1965   3 Sheets-Sheet 3

INVENTOR.
ERNEST E. MULCH

WITNESS:

3,324,805
AUTOMOBILE PARKING APPARATUS
Ernest E. Mulch, 8135 N. 5th St., Phoenix, Ariz. 85020
Filed May 6, 1965, Ser. No. 453,841
1 Claim. (Cl. 104—250)

ABSTRACT OF THE DISCLOSURE

A parking apparatus comprising a self-contained unit which may be placed on a pavement surface over which the driving wheels of the motor vehicle may be driven and which automatically immobilizes the driving power from such wheels to move the vehicle under automatic and releasable control conditions, the device being particularly adapted to control the parking of motor vehicles and the movement of the same until appropriate fees or permission is given to allow the vehicle to be driven away.

---

This invention pertains to improvements in automobile parking apparatus and is particularly directed to a device for the parking of automobiles in a mechanical traction stall system which automatically controls either individual parking stalls or multiple parking stalls.

One of the objects of this invention is to provide more efficient parking in conjested areas where ground space available for parking automobiles is very expensive but garages for the parking of automobiles have become popular.

Another object of this invention is to make provision for the owner of the automobile to park in a garage, or any other place where this system is set up, without the necessity of a parking attendant being employed.

Still another object of this invention is to set up parking lots on the ground level which are marginal parking lots in that there is not enough space to provide enough space to provide enough income to pay for an attendant at the lot so as to eliminate the need of an attendant on the premises.

It is a further object of this invention to provide a parking system where the automobile may be driven into a parking stall, whether it be a ground level or in a multiple-story parking garage, and the automobile cannot be driven from the parking stall until a coin is deposited to pay for the parking time, so that when a coin is deposited then the stall parking device is released showing that the car may be driven off.

Another object of this invention consists in providing a series of rollers set in an incline in a manner sufficient to immobilize an automobile unless the rollers are locked manually either by a keying system or deposit of coin or other similar device so that a parked vehicle cannot leave its stall until the rollers are locked in a traction position by paying the required fee.

And still another object is to provide a parking apparatus that can be applied to multi-level, covered parking without attendants; multi-level, covered parking where there is either entry or exit control; ground level open parking without attendants or ground level open parking where the entry or the exit is controlled; high-density municipal curb parking where there is no attendant; toll bridges; toll gates; toll roads; and estates where there is a restriction on the public entry into the estates; these objects being merely illustrative and are not to be construed as limiting the uses of this invention.

Further features and advantages of this invention will appear from a detailed description of the drawings in which.

Figure 1:
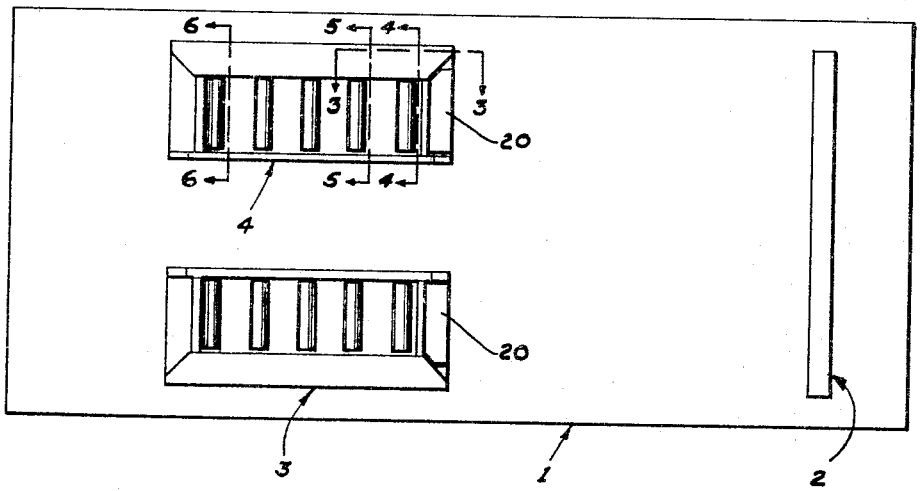
FIG. 1 is a plan view of an automobile parking apparatus incorporating the features of this invention.

As shown in FIG. 1, the right hand parking unit 3 and left hand parking unit 4 are located in the parking stall 1 so that the rear wheels of the automobile rests on the units when the car is parked in the stall. It is understood that the stalls 1 including a floor surface can be arranged in any convenient manner with respect to one another. That is, they may be in 45°, 60° or 90° angular relationship as used in most parking lots. When constructing new parking lots or parking within buildings, a 2 to 3° slope "Down" may be provided from rear to front to make the device of this invention more effiecient in operation. The surface of the stalls may be of any usual materials such as concrete, asphalt, or gravel. The front stop 2 and parking units 3 and 4 are secured to the surface of the parking stall by anchors set into the subsurface.

Figure 2:
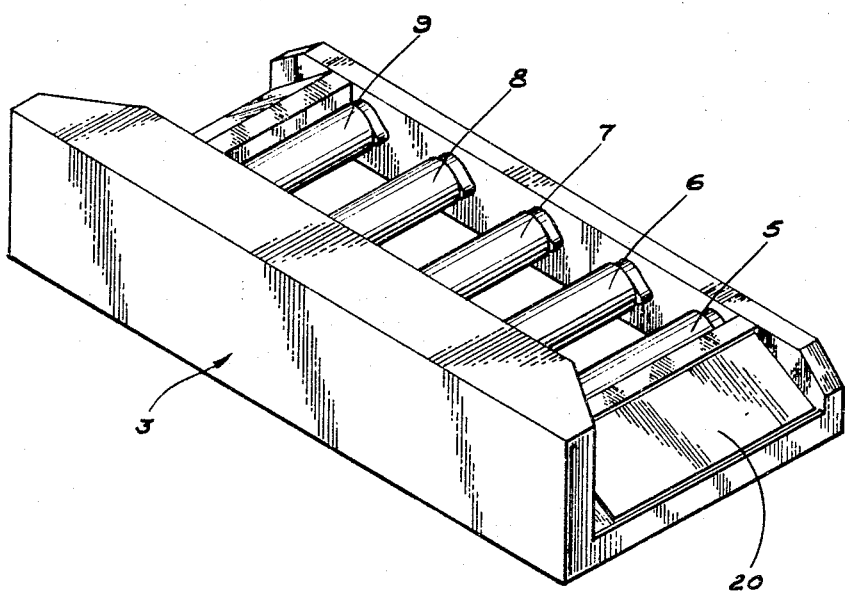
FIG. 2 is an enlarged perspective view of one of the essential elements of the parking apparatus shown in FIG. 1.
Figure 3:
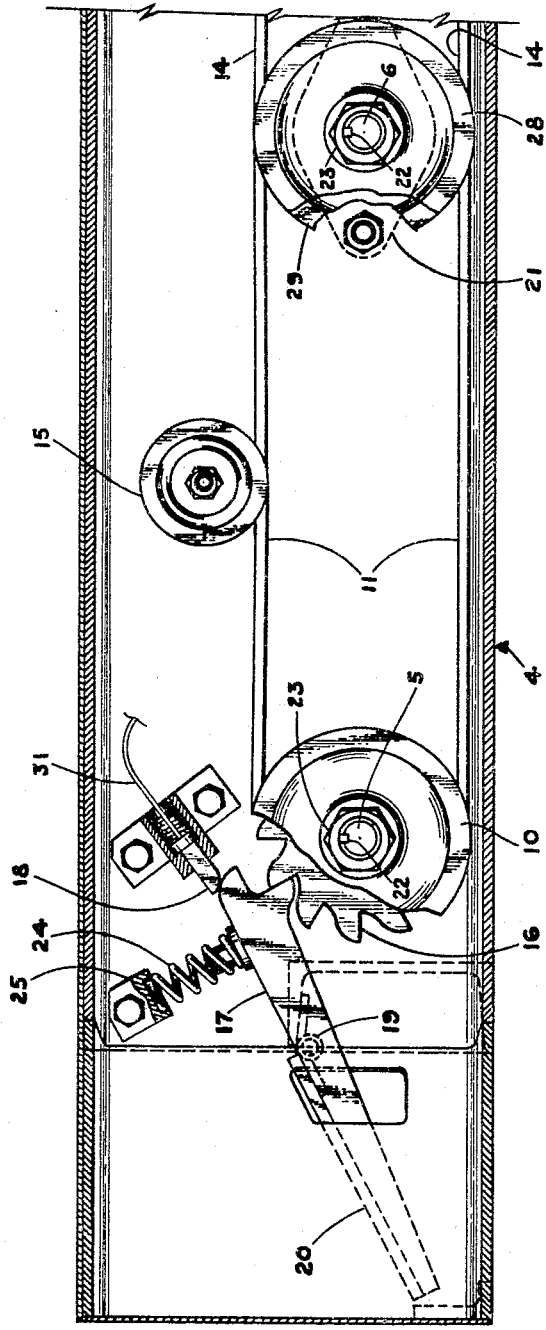
FIG. 3 is an enlarged fragmentary sectional view on the line 4—4 of FIG. 1.

As shown in FIG. 2, a series of rollers 5, 6, 7, 8 and 9 are located adjacent and parallel to one another and journaled on the framework of the parking units 3 and a trip plate 20, located at the front end of the parking unit is depressed when a car enters the stall and the front wheel passes over it. Referring to FIG. 3, the sequence of action when a car enters the stall is such that trip plate 20 is depressed about hinge pin 19 by the weight of the front wheel passing over it. A pawl arm 17 is attached to one end of trip plate 20 and pivots about hinge pin 19 as the trip plate is depressed such that the pawl is lifted and latched to latch assembly 18 while simultaneously compressing spring 24 into spring guide 25. With pawl arm 17 latched clear of ratchet wheel 16, ratchet wheel 16 is free to rotate. As ratchet wheel 16 is connected to the end of roller 5 by means of key 22 and nut 23, roller 5 is also free to rotate. Conversely, to restrain rotation of roller 5, cable 31 is pulled so that latch 18 releases pawl arm 17 allowing it to engage ratchet wheel 16 by the force exerted from spring 24.

Figure 4:
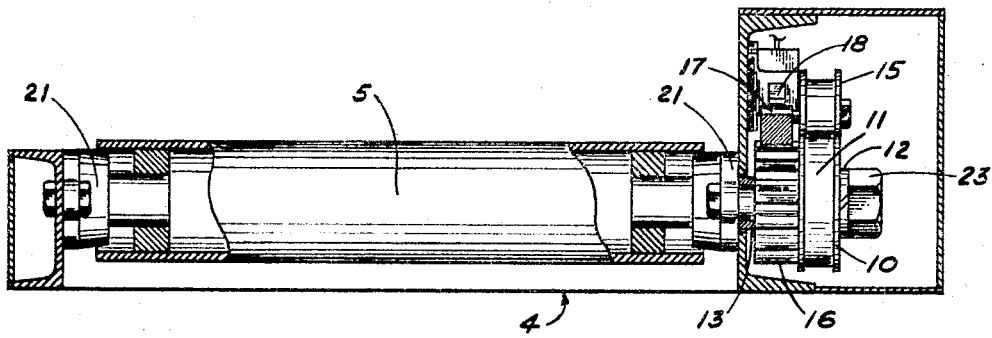
FIG. 4 is an enlarged section on line 4—4 of FIG. 1.
Figure 5:
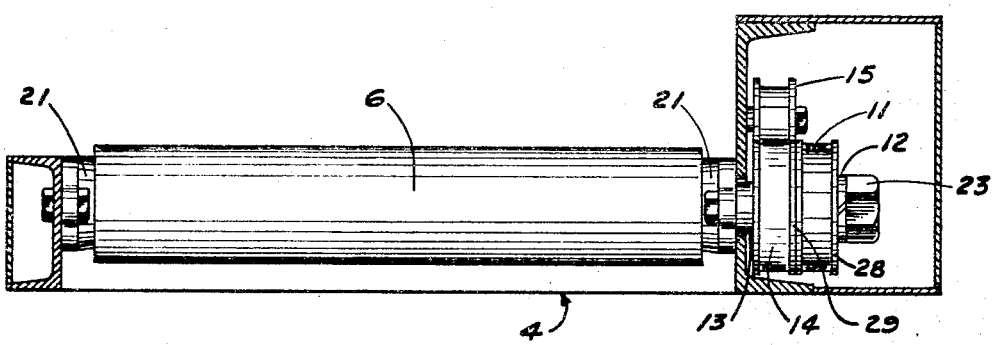
FIG. 5 is an enlarged section on line 5—5 of FIG. 1.

As shown in FIG. 4, roller 5 is suspended at each end on bearings 21 so that it is free to rotate unless restrained by ratchet wheel 16 engaged with pawl arm 17. Pawl arm 17 is shown in the engaged or restraining position in FIGS. 3 and 4. Adjacent roller 6 (FIG. 3) is restrained from rotating by interconnecting belt 11 which runs around pulley 10 and pulley 28. Pulley 10 is fastened on roller 5 by key 22, lock washer 12 and nut 23. Similarly, pulley 28 is fastened on roller 6 by means of an identical key 22, lock washer 12 and nut 23.

Figure 6:
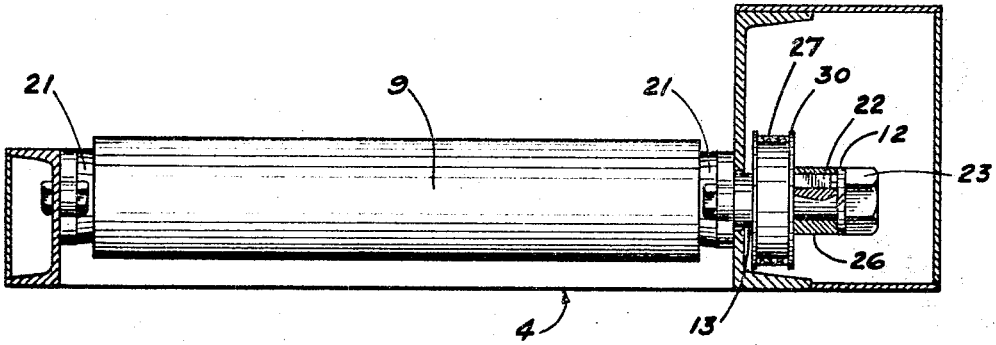
FIG. 6 is an enlarged section on line 6—6 of FIG. 1.

Belt 14 and idler take-up pulley 15, shown in FIG. 3, connects roller 6 and roller 7 together so that if roller 6 cannot rotate, roller 7 cannot rotate either. Referring to FIG. 2, similar belts (not shown) connect roller 7 to roller 8, roller 8 to roller 9. As roller 9 is at the end of the series, it requires only one belt and one pulley as shown in FIG. 6. A spacer 26 on roller 9 is used to fill an equivalent space occupied by pulleys on rollers 6, 7 and 8 so that rollers 5, 6, 7, 8 and 9 are all identical to manufacture.

To equip one parking stall there are two parking units 3 and 4 used. One to immobilize each wheel so that both of the drive wheels of the automobile are immobilized simultaneously, whether this be a rear wheel drive vehicle or a front wheel drive vehicle.

In summary, when trip plate 20 is momentarily depressed, all rollers become free to rotate until such time as cable 31 is pulled, allowing pawl 17 to restrain roller 5 and in turn restrain rollers 6, 7, 8 and 9 by means of interconnecting belts. The rollers are restrained positively in the direction required for a car to back off the module, thus permitting car to easily back out of stall. However, if car should try to drive forward, over the front stop 2, rollers will ratchet, and pawl arm will latch away from ratchet wheel, again allowing all rollers to rotate freely.

While the apparatus herein disclosed and described constitutes a preferred form of the invention, it is also to be understood that the apparatus is capble of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

An automobile parking apparatus comprising in combination:
(A) a frame,
(B) a plurality of laterally disposed parallel tire supporting rollers journaled on said frame,
(C) common drive means for connecting said rollers for rotation together,
(D) a single ratchet wheel fixed solely to one of said rollers,
(E) a pawl arm movably mounted on said frame to normally engage and arrest rotation of said ratchet wheel in one direction,
(F) yielding means for normally urging said pawl arm into said arresting position,
(G) a releasable latch on said frame to secure said pawl arm in released position for free rotation of said ratchet wheel,
(H) and a tire actuated trip plate fixed to said pawl arm arranged when engaged by the vehicle tire to move said pawl arm to released position to allow said latch to secure said pawl arm for free rotation of all of said rollers,
(I) and remote control means for operating said latch to releasing position.

References Cited

UNITED STATES PATENTS

| | | | |
|---|---|---|---|
| 1,833,354 | 11/1931 | Burnett | 246—125 |
| 1,881,033 | 10/1932 | Smith | 104—44 |
| 2,428,856 | 10/1947 | Sinclair | 104—48 X |
| 2,598,750 | 6/1952 | Bargehr | 104—48 X |
| 2,633,809 | 4/1953 | Robinson et al. | 104—48 |
| 2,661,817 | 12/1953 | Mullins | 104—44 X |
| 3,079,871 | 3/1963 | Brodie | 104—44 |
| 3,255,711 | 6/1966 | Kiraly | 104—44 X |

ARTHUR L. LA POINT, *Primary Examiner.*

D. F. WORTH, *Assistant Examiner.*